(12) United States Patent
Peng et al.

(10) Patent No.: US 9,212,081 B2
(45) Date of Patent: Dec. 15, 2015

(54) METHODS OF CUTTING A LAMINATE STRENGTHENED GLASS SUBSTRATE

(71) Applicant: Corning Incorporated, Corning, NY (US)

(72) Inventors: Gaozhu Peng, Horseheads, NY (US); Xinghua Li, Horseheads, NY (US); Rui Zhang, Elmira, NY (US)

(73) Assignee: Corning Incorporated, Corning, NY (US)

( * ) Notice: Subject to any disclaimer, the term of this patent is extended or adjusted under 35 U.S.C. 154(b) by 103 days.

(21) Appl. No.: 13/800,003

(22) Filed: Mar. 13, 2013

(65) Prior Publication Data

US 2014/0138420 A1    May 22, 2014

Related U.S. Application Data

(60) Provisional application No. 61/728,918, filed on Nov. 21, 2012.

(51) Int. Cl.
*B23K 26/00* (2014.01)
*B26F 3/00* (2006.01)
*C03B 33/07* (2006.01)
(Continued)

(52) U.S. Cl.
CPC ............... *C03B 33/076* (2013.01); *C03B 33/07* (2013.01); *C03B 33/093* (2013.01); *C03B 33/0955* (2013.01); *Y10T 225/12* (2015.04)

(58) Field of Classification Search
USPC ............ 225/2, 5, 94, 96; 219/121.75, 121.67, 219/121.85, 121.72, 121.69
See application file for complete search history.

(56) References Cited

U.S. PATENT DOCUMENTS

| | | | |
|---|---|---|---|
| 3,737,294 A | 6/1973 | Dumbaugh, Jr. et al. |
| 3,746,526 A | 7/1973 | Giffon |
| 3,849,097 A | 11/1974 | Giffen et al. |

(Continued)

FOREIGN PATENT DOCUMENTS

| | | |
|---|---|---|
| EP | 1158343 | 11/2001 |
| EP | 1803538 | 7/2007 |

(Continued)

OTHER PUBLICATIONS

International Search Report, dated Mar. 14, 2014, pp. 1-5, International Patent Application No. PCT/US2013/070864, European Patent Office, The Netherlands.

(Continued)

*Primary Examiner* — Omar Flores Sanchez

(57) ABSTRACT

Methods of cutting laminate strengthened glass substrates are disclosed. A method is disclosed which includes providing a laminate strengthened glass substrate having a glass core layer with first and second surface portions, and at least one glass cladding layer fused to the first surface portion or the second surface portion of the glass core layer. The glass core layer has a core coefficient of thermal expansion that is larger than a cladding coefficient of thermal expansion. The method further includes forming an edge defect on the laminate strengthened glass substrate, heating first and second regions of the laminate strengthened glass substrate on the at least one glass cladding layer. The first and second regions are offset from first and second sides of a desired line of separation, respectively. The method further includes propagating a crack imitated at the edge defect between the first and second regions.

20 Claims, 6 Drawing Sheets

(51) Int. Cl.
*C03B 33/09* (2006.01)
*C03B 33/095* (2006.01)

(56) References Cited

U.S. PATENT DOCUMENTS

| | | | |
|---|---|---|---|
| 3,931,438 | A | 1/1976 | Beall et al. |
| 4,102,664 | A | 7/1978 | Dumbaugh, Jr. |
| 4,214,886 | A | 7/1980 | Shay et al. |
| 5,342,426 | A | 8/1994 | Dumbaugh, Jr. |
| 5,559,060 | A | 9/1996 | Dumbaugh, Jr. et al. |
| 5,968,382 | A | 10/1999 | Matsumoto et al. |
| 6,211,488 | B1 | 4/2001 | Hoekstra et al. |
| 6,420,678 | B1 * | 7/2002 | Hoekstra ............ 219/121.75 |
| 6,576,870 | B2 | 6/2003 | Wu |
| 7,201,965 | B2 | 4/2007 | Gulati et al. |
| 7,514,149 | B2 | 4/2009 | Bocko et al. |
| 7,880,118 | B2 * | 2/2011 | Cheng et al. ......... 219/121.72 |
| 8,007,913 | B2 | 8/2011 | Coppola et al. |
| 8,053,704 | B2 * | 11/2011 | Abramov et al. ...... 219/121.68 |
| 8,168,514 | B2 | 5/2012 | Garner et al. |
| 8,269,138 | B2 * | 9/2012 | Garner et al. ......... 219/121.69 |
| 8,348,115 | B2 * | 1/2013 | Wakayama ............... 225/2 |
| 8,621,738 | B2 * | 1/2014 | Iwamoto et al. .......... 29/426.1 |
| 8,720,228 | B2 | 5/2014 | Li |
| 8,932,510 | B2 | 1/2015 | Li et al. |
| 2003/0052098 | A1 * | 3/2003 | Kim et al. ............ 219/121.68 |
| 2004/0251290 | A1 * | 12/2004 | Kondratenko ............... 225/2 |
| 2006/0022008 | A1 * | 2/2006 | Brown et al. ............... 225/1 |
| 2007/0151962 | A1 | 7/2007 | Doll et al. |
| 2009/0107585 | A1 * | 4/2009 | Sakai et al. ............... 148/121 |
| 2011/0017713 | A1 * | 1/2011 | Abramov et al. ...... 219/121.67 |
| 2012/0024928 | A1 * | 2/2012 | Matsumoto et al. .......... 225/2 |
| 2013/0280465 | A1 * | 10/2013 | Matsumoto et al. ......... 428/43 |
| 2014/0054348 | A1 * | 2/2014 | Teranishi et al. ............ 225/2 |

FOREIGN PATENT DOCUMENTS

| | | |
|---|---|---|
| JP | 2004066745 | 3/2004 |
| JP | 2010090010 | 4/2010 |
| WO | 01/85387 | 11/2001 |

OTHER PUBLICATIONS

Written Opinion of the International Searching Authority, dated Mar. 14, 2014, pp. 1-9, International Patent Application No. PCT/US2013/070864, European Patent Office, The Netherlands.

* cited by examiner

METHODS OF CUTTING A LAMINATE STRENGTHENED GLASS SUBSTRATE

CROSS-REFERENCE TO RELATED APPLICATIONS

This application claims the benefit of priority under 35 U.S.C. §119 of U.S. Provisional Ser. No. 61/728,918, filed Nov. 21, 2012, the content of which is relied upon and incorporated herein by reference in its entirety.

FIELD

The present application generally relates to methods for separating laminate strengthened glass substrates and, more specifically, to methods for separating laminate strengthened glass substrates by tension and compression manipulation.

BACKGROUND

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

SUMMARY

According to one embodiment, a method of cutting a laminate strengthened glass substrate comprises providing a laminate strengthened glass substrate having a glass core layer with a first surface portion and a second surface portion that is opposite from the first surface portion, and at least one glass cladding layer fused to the first surface portion or the second surface portion of the glass core layer. The glass core layer has an average core coefficient of thermal expansion $CTE_{core}$, and the at least one glass cladding layer has an average cladding coefficient of thermal expansion $CTE_{cladding}$ which is less than the average core coefficient of thermal expansion $CTE_{core}$. The method can further comprise forming an edge defect at an edge of the laminate strengthened glass substrate, heating a first region of the laminate strengthened glass substrate on the at least one glass cladding layer, and heating a second region of the laminate strengthened glass substrate on the at least one glass cladding layer. The first region is offset from a first side of a desired line of separation, and the second region is offset from a second side of the desired line of separation. The method can further comprise propagating a crack imitated at the edge defect along the desired line of separation between the first and second regions of the laminate strengthened glass substrate.

According to another embodiment, a method of cutting a laminate strengthened glass substrate comprises providing a laminate strengthened glass substrate having a glass core layer with a first surface portion and a second surface portion that is opposite from the first surface portion, and at least one glass cladding layer fused to the first surface portion or the second surface portion of the glass core layer. The glass core layer has an average core coefficient of thermal expansion $CTE_{core}$, and the at least one glass cladding layer has an average cladding coefficient of thermal expansion $CTE_{cladding}$ which is less than the average core coefficient of thermal expansion $CTE_{core}$. The method can further comprise forming a first reduced central tension zone extending along and offset from a desired line of separation, and forming a second reduced central tension zone also extending along the desired line of separation. The first reduced central tension zone is offset from a first side of the desired line of separation, and the second reduced central tension zone is offset from a second side of the desired line of separation. The first and second reduced central tension zones have a reduced tension $CT_1$ that is less than a center tension $CT_2$ along the desired line of separation. The method can further comprise propagating a crack along the desired line of separation between the first reduced central tension zone and the second reduced central tension zone.

Additional features and advantages of the methods for cutting laminate strengthened glass substrates described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
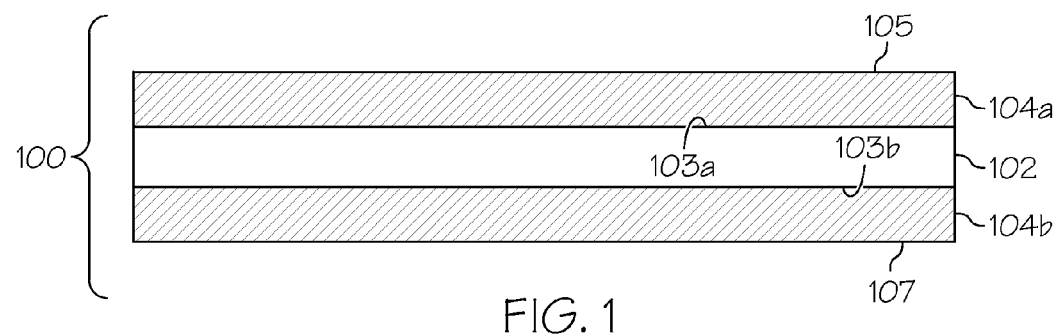
FIG. 1 schematically depicts a cross section of a laminated strengthened glass substrate sheet according to one or more embodiments shown and described herein.

Reference will now be made in detail to embodiments of methods for cutting laminate strengthened glass substrates, examples of which are illustrated in the accompanying drawings. Whenever possible, the same reference numerals will be used throughout the drawings to refer to the same or like parts. As described in more detail below, embodiments provide for methods of cutting laminate strengthened glass substrates by using lasers or other fast and local heating sources to manipulate center tension and compressive stresses along a desired line of separation to provide a path of least resistance for which a crack may be guided. Because the center tension of the glass core layer and cladding compression in fusion laminated glass substrates are both instantaneously inversely proportional to the temperature difference between the lower of the set points of the core glass layer and the glass cladding layer, the center tension and compressive stress magnitudes and profiles may be managed to avoid unguided crack propagation and provide controlled fracture and stable guided crack growth. Various methods for cutting laminate strengthened glass substrates will be described in more detail herein with specific reference to the appended drawings.

Glass articles can be strengthened by thermal tempering and/or by ion exchange treatment. In such cases, the glass article can be subjected to additional processing steps after the glass article is formed, and these additional processing steps may increase the overall cost of the glass article. Moreover, the additional handling required to carry out these processing steps can increase the risk of damage to the glass article, which can decrease manufacturing yields and can further increase production costs and the ultimate cost of the glass article.

Double fusion draw is another method for producing strengthened glass substrates. Double fusion draw creates a three-layer laminate strengthened glass substrate having a core layer positioned between two cladding layers. When the core glass has a higher coefficient of thermal expansion than the cladding glass, compressive stress is present in the cladding layers, and counter-balanced by center tension naturally generated in the core layer as the laminate strengthened glass substrate is cooled from annealing and strain point to a lower temperature. The strengthening via compressive stressed cladding layers provides additional damage resistance. The presence of damage resisting cladding layers with a high center tension core can make the laminate strengthened glass substrate challenging to cut by traditional methods, such as mechanical scribe and separation methods, and laser scribe and separation methods.

Referring now to FIG. 1, a laminated strengthened glass substrate 100 is schematically depicted in cross section. As described in more detail below, laminated strengthened glass substrates may be cut at the bottom of a draw process, as well as after the draw process to separate a laminate strengthened glass substrate into a plurality of laminate strengthened glass articles. The laminated strengthened glass substrate 100 generally comprises a glass core layer 102 and a pair of glass cladding layers 104a, 104b. It is noted that, in other embodiments, the laminated strengthened glass substrate may include only one glass cladding layer, thereby providing a two-layer substrate.

Still referring to FIG. 1, the glass core layer 102 having a first surface 105 and a second surface 107 generally comprises a first surface portion 103a and a second surface portion 103b, which is opposed to the first surface portion 103a. A first glass cladding layer 104a is fused to the first surface portion 103a of the glass core layer 102 and a second glass cladding layer 104b is fused to the second surface portion 103b of the glass core layer 102. The glass cladding layers 104a, 104b are fused to the glass core layer 102 without any additional materials, such as adhesives, coating layers or the like, disposed between the glass core layer 102 and the glass cladding layers 104a, 104b.

In the embodiments of the laminated strengthened glass substrate 100 described herein, the glass core layer 102 is formed from a first glass composition having an average core coefficient of thermal expansion $CTE_{core}$ and the glass cladding layers 104a, 104b are formed from a second, different glass composition, which has an average cladding coefficient of thermal expansion $CTE_{cladding}$. The term "CTE," as used herein, refers to the coefficient of thermal expansion of the glass composition averaged over a temperature range from about 20° C. to about 300° C. The $CTE_{core}$ is greater than $CTE_{cladding}$, which results in the glass cladding layers 104a, 104b being compressively stressed without being ion exchanged or thermally tempered.

Figure 2:
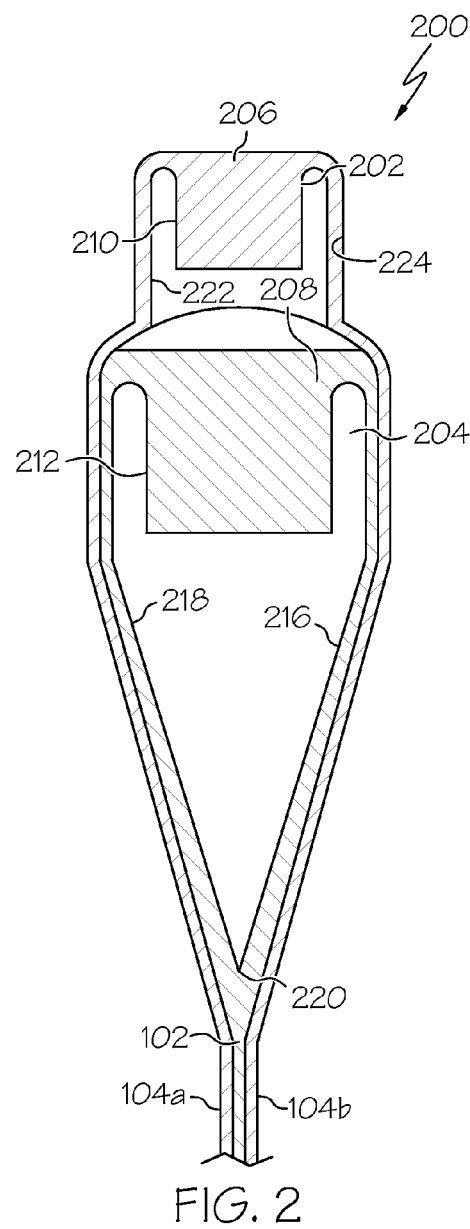
FIG. 2 schematically depicts a fusion draw process for making the laminated strengthened glass substrate sheet of FIG. 1.

Specifically, the laminated strengthened glass substrates 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article comprises an upper isopipe 202 which is positioned over a lower isopipe 204. The upper isopipe 202 comprises a trough 210 into which a molten glass cladding composition 206 is fed from a melter (not shown). Similarly, the lower isopipe 204 comprises a trough 212 into which a molten glass core composition 208 is fed from a melter (not shown). In the embodiments, described herein, the molten glass core composition 208 has an average coefficient of thermal expansion $CTE_{core}$, which is greater than the average coefficient of thermal expansion $CTE_{cladding}$ of the molten glass cladding composition 206.

As the molten glass core composition 208 fills the trough 212, the molten glass core composition 208 overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204, thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202, such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average coefficient of thermal expansion $CTE_{core}$, which is greater than the average cladding coefficient of thermal expansion $CTE_{cladding}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause compressive stresses to develop in the glass cladding layers 104a, 104b. The compressive stress increases the strength of the resulting laminated glass article without an ion-exchange treatment or thermal tempering treatment. Glass compositions for the glass core layer 102 and the glass cladding layers 104a, 104b may include, but are not limited to, the glass compositions described in U.S. Pat. Appl. No. 61/604,869 entitled "High CTE Potassium Borosilicate Core Glasses and Glass Articles Comprising the Same", and U.S. Pat. Appl. No. 61/604,839 entitled "Low CTE Alkali-Free BoroAluminosilcate Glass Compositions and Glass Articles Comprising the Same", both of which are assigned to Corning Incorporated and incorporated herein by reference in their entireties.

Table 1 lists glass compositions utilized in an exemplary manner hereinbelow.

laminated strengthened glass substrate 100 are formed from glass compositions, which have a lower average coefficient of thermal expansion to facilitate the development of compressive stress in the cladding layers upon cooling of the laminated glass article following fusion formation.

More specifically, for a given cladding and core thickness ratio, the difference of CTE between the glass cladding layer 104a, 104b composition and the glass core layer 102 composition, and the subsequent cooling of the glass cladding layers 104a, 104b and glass core layer 102 from around the set points (e.g., about 5° C. above the glass strain point) to a lower temperature (e.g., room temperature). When the glass core layer 102 composition has a higher CTE than the glass cladding layer 104a, 104b composition, compressive stress (CS) is present in glass cladding layer 104a, 104b and counterbalanced by center tension (CT) naturally generated in glass core layer 102 as the laminate strengthened glass substrate 100 cools. The glass cladding layer 104a, 104b compressive stress CS may be described by Eq. (1):

$$CS_{25°\,C.} = \left(\frac{E_{core}}{1-v_{core}}\right)\frac{(\alpha_{clad}-\alpha_{core})(T^*-25)}{\left[\frac{h_{clad}}{h_{core}} + \frac{E_{core}}{E_{clad}}\left(\frac{1-v_{clad}}{1-v_{core}}\right)\right]}. \quad (1)$$

The center tension (CT) within the glass core layer 102 may be described by Eq. (2):

$$CT_{25°\,C.} = \left(\frac{E_{clad}}{1-v_{clad}}\right)\frac{(\alpha_{core}-\alpha_{clad})(T^*-25)}{\left[\frac{h_{core}}{h_{clad}} + \frac{E_{clad}}{E_{core}}\left(\frac{1-v_{core}}{1-v_{clad}}\right)\right]}, \quad (2)$$

TABLE 1

Glass Compositions

| Oxide | A mol % | B mol % | C mol % | D mol % | E mol % | F mol % | G mol % | H mol % | I mol % | J mol % |
|---|---|---|---|---|---|---|---|---|---|---|
| $SiO_2$ | 66.16 | 65.68 | 66.2 | 73.3 | 69.49 | 81.7 | 69.27 | 61.51 | 62.24 | 64.60 |
| $Al_2O_3$ | 10.29 | 12.29 | 10.70 | 6.57 | 10.29 | | 10.58 | 11.07 | 10.89 | 7.50 |
| $B_2O_3$ | 0.6 | 9.10 | | 9.11 | | 16.4 | | 10.02 | 9.79 | 16.73 |
| $Na_2O$ | 14 | 6.60 | 13.30 | | 14.01 | | 14.76 | .053 | 0.043 | 0.0106 |
| $K_2O$ | 2.45 | 1.30 | 2.51 | | 1.16 | 1.9 | 0.012 | 2.43 | 2.33 | |
| $Li_2O$ | | 4.99 | | | | | | | | |
| MgO | 5.7 | 0 | 5.96 | 0.28 | 6.2 | | 5.27 | 6.38 | 6.29 | 2.10 |
| CaO | 0.58 | 0.023 | 0.28 | 10.3 | 0.507 | | | 8.46 | 5.31 | 7.89 |
| BaO | | | | | | | | 0.022 | 0.008 | |
| $ZrO_2$ | 0.0105 | | | | 0.01 | | 0.0057 | | 0.032 | 0.010 |
| $TiO_2$ | | 0.0082 | 0.62 | | | | | | 0.0083 | 0 |
| $Sb_2O_3$ | | | | | | | | | | |
| $As_2O_3$ | | | 0.25 | 0.12 | | | | | | |
| $SnO_2$ | 0.21 | | | 0.0084 | 0.185 | | 0.11 | 0.069 | 0.079 | 0.069 |
| SrO | | | | 0.31 | | | | | 2.95 | 1.08 |
| $Fe_2O_3$ | 0.0081 | 0.0082 | | | 0.008 | | 0.0072 | 0.016 | 0.021 | 0.004 |

Currently, glasses with glass compositions A, C, D, E, F, G, H and I can be obtained from Corning Incorporated under the glass names or numbers 2317, 0317, Eagle 2000®, 2318, 7761, 2319, 2816, and 2916, respectively, and glasses with glass compositions B and J have also been manufactured by Corning Incorporated.

Referring again to the laminated strengthened glass substrate 100 depicted in FIG. 1, the glass core layer 102 of the laminated glass article is formed from a glass composition with a relatively high average coefficient of thermal expansion, such as the glass compositions described herein which have coefficients of thermal expansion greater than or equal to $75 \times 10^{-7}/°$ C. The glass cladding layers 104a, 104b of the where $E_{core}$ and $E_{clad}$ are the elastic moduli of the core and cladding glasses, respectively; $v_{core}$ and $v_{clad}$ are the Poisson's ratios of the core and cladding glasses, respectively; $T^*$ is the lower of the set points of the core and cladding glasses in Celsius (set point is defined as 5° C. above the glass strain point); $\alpha_{core}$ and $\alpha_{clad}$ are the average coefficient of thermal expansion from the set point $T^*$ to room temperature for which 25° C. is used in the formulas above for the core and cladding glasses, respectively; $h_{core}$ is the half thickness of the core; and $h_{clad}$ is the cladding thickness.

Eqs. (1) and (2) are provided to characterize the stress level achievable from a given glass composition pair at room temperature (i.e., 25° C.). It is noted that, when the glass composition is set at another temperature T which is between room temperature and T*, both CS and CT will decrease proportionally. Accordingly, Eqs. (1) and (2) may be generalized as follows:

$$CS = \left(\frac{E_{core}}{1-v_{core}}\right) \frac{(\alpha_{clad} - \alpha_{core})(T^* - T)}{\left[\frac{h_{clad}}{h_{core}} + \frac{E_{core}}{E_{clad}}\left(\frac{1-v_{clad}}{1-v_{core}}\right)\right]}, \quad (3)$$

$$CT = \left(\frac{E_{clad}}{1-v_{clad}}\right) \frac{(\alpha_{core} - \alpha_{clad})(T^* - T)}{\left[\frac{h_{core}}{h_{clad}} + \frac{E_{clad}}{E_{core}}\left(\frac{1-v_{core}}{1-v_{clad}}\right)\right]}. \quad (4)$$

As CS and CT must balance each other, Eq. (5) provides:

$$\frac{CS}{CT} = -\frac{h_{core}}{h_{clad}}. \quad (5)$$

Figure 3:
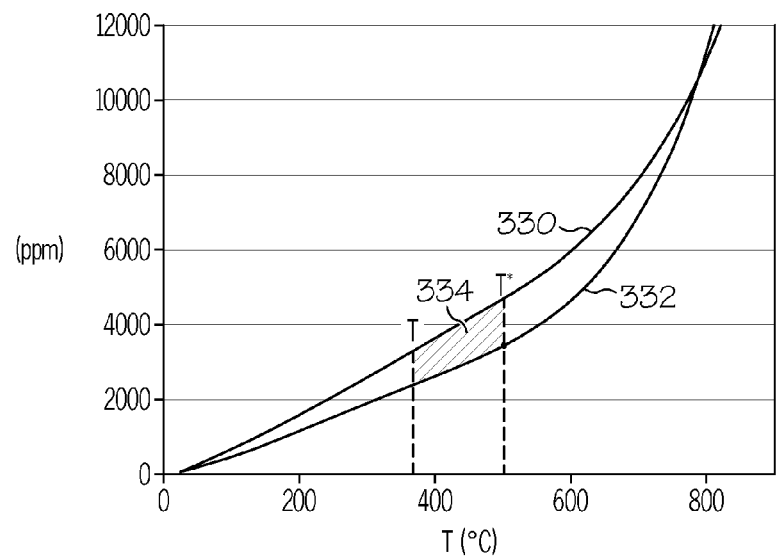
FIG. 3 is a graph that plots thermal expansion vs. temperature for an exemplary glass core layer composition and an exemplary glass cladding layer composition according to one or more embodiments shown and described herein.

From Eqs. (3) and (4), CS and CT may be instantaneously changed with a local temperature change, which is illustrated in the graph of FIG. 3. FIG. 3 plots thermal expansion vs. temperature for a glass core layer composition 330 and a glass cladding layer composition 332. The data for curve 330 corresponds to glass A, and the data for curve 332 corresponds to glass B. It should be understood that these glass compositions are used merely as examples, and that other glass compositions may be utilized.

As shown in FIG. 3, the stress is proportional to the shaded area 334 as the temperature goes up to T* (513° C. for the illustrative A-B glass composition pair). Accordingly, CS and CT magnitudes and profiles may be manipulated along and around a desired line of separation via a selected and controlled temperature pattern applied around the line. This approach is different from existing methods, where the glass composition pair is heated uniformly, or heated directly on the desired line of separation where the maximum power is located right along the cut line.

Figure 4A:
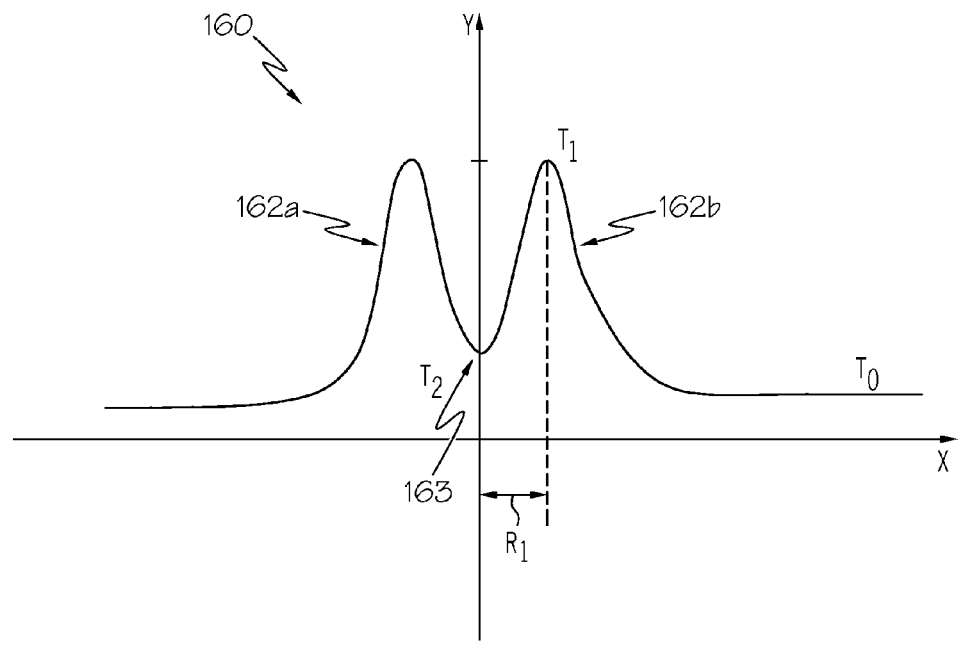
FIG. 4A is a graph depicting an exemplary temperature profile on a surface of a laminate strengthened glass substrate about a desired line of separation according to one or more embodiments shown and described herein.
Figure 4B:
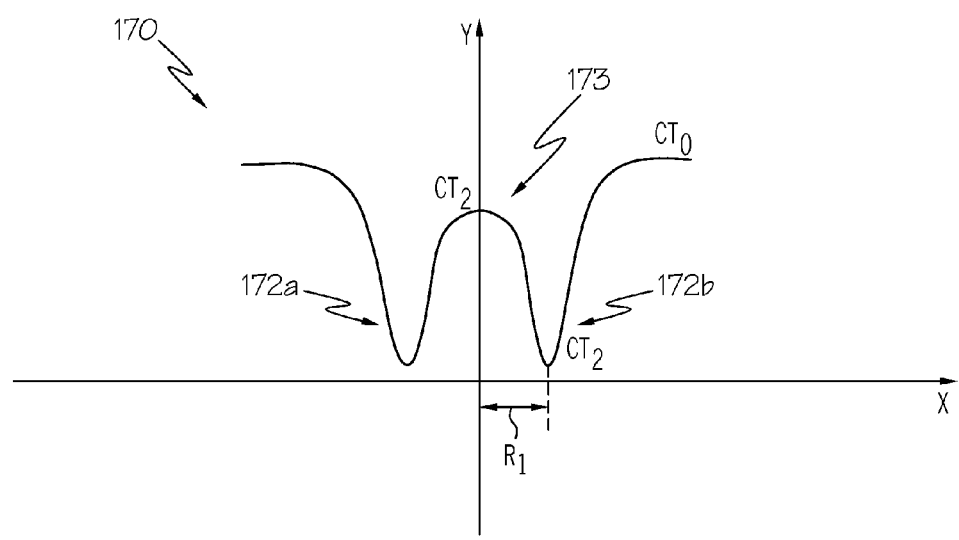
FIG. 4B is a graph depicting a center tension profile of the laminate strengthened glass substrate resulting from the temperature profile depicted in FIG. 4A according to one or more embodiments shown and described herein.
Figure 4C:
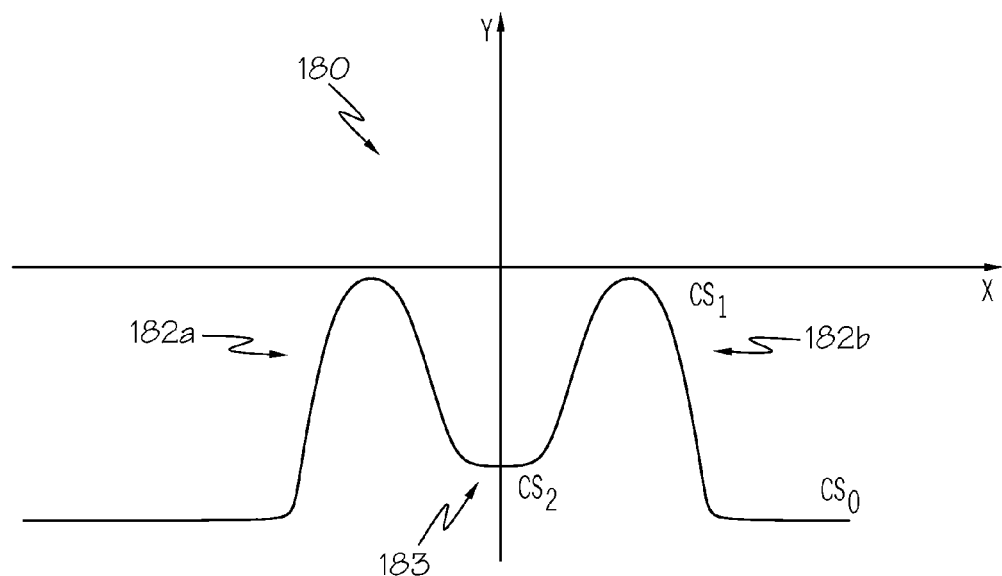
FIG. 4C is a graph depicting a compressive stress profile of the laminate strengthened glass substrate resulting from the temperature profile depicted in FIG. 4A according to one or more embodiments shown and described herein.

An illustrative temperature profile 160, and a corresponding center tension profile 170 and compressive stress profile 180 are depicted in FIGS. 4A-4C, respectively. FIG. 4A depicts temperature profile 160 across a desired line of separation where the horizontal axis is the distance from the desired line of separation (x=0), and the vertical axis is temperature. In the illustrated example, a first region 162a and a second region 162b of a surface of a cladding glass layer are heated to a maximum temperature $T_1$. Both the first region 162a and the second region 162b are offset from the desired line of separation by an offset distance $R_1$. A small $R_1$ will make crack propagation more stable and stay along the cutting line. In some embodiments, $R_1$ is less than 3 mm. In other embodiments, $R_1$ is less than 1.5 mm. In yet other embodiments, $R_1$ is less than 0.75 mm. According, the area of glass cladding layer that is directly on the desired line of separation is not heated to the maximum temperature $T_1$, but rather a temperature $T_2$ that is less than the maximum temperature $T_1$. The area outside of the first region 162a, the second region 162b, and the desired line of separation may be near an ambient temperature $T_0$ such that $T_2 < T_1$, and $T_1 > T_0$.

As described above with respect to FIG. 3 and Eqs. (3) and (4), a change in local temperature instantaneously changes the CT within the glass core layer. FIG. 4B depicts a center tension profile 170, according to the temperature profile depicted in FIG. 4A and applied to a laminate strengthened glass substrate. The horizontal axis is the distance from the desired line of separation (x=0), and the vertical axis is CT. As shown in FIG. 4B, a first reduced central tension zone 172a corresponding to the first region 162a and a second reduced central tension zone 172b corresponding to the second region 162b have a center tension ($CT_1$) that is lower than a center tension ($CT_2$) at the desired line of separation due to the localized heating at the first and second regions 162a, 162b. The remaining area of the laminate strengthened glass substrate has a native center tension ($CT_0$) such that $CT_2 > CT_1$ and $CT_1 < CT_0$.

FIG. 4C depicts a compressive stress profile 180 according to the center tension profile 170 depicted in FIG. 4B. The horizontal axis is the distance from the desired line of separation (x=0), and the vertical axis is CS. As shown in FIG. 4C, a first reduced compressive stress zone 182a corresponding to the first region 162a and a second reduced compressive stress zone 182a corresponding to the second region 162b have a compressive stress ($CS_1$) that is lower in magnitude than a compressive stress ($CS_2$) at the desired line of separation due to the localized heating at the first and second regions 162a, 162b. The remaining area of the laminate strengthened glass substrate has a native compressive stress ($CS_0$) such that $CS_2 > CS_1$ and $CS_1 < CS_0$.

Heating the surface of the laminate strengthened glass substrate as described above forms first and second reduced central tension zones 172a, 172b having $CT_1$ provide a boundary for a crack propagating along or near the desired line of separation because the region of the laminate strengthened glass substrate having $CT_2$ will be the preferred and least-resistance path for crack propagation. In other words, the lower $CT_1$ of the first and second reduced central tension zone 172a, 172b guide the propagating crack along the desired line of separation. Accordingly, $CT_1$ and $CT_2$ (similarly, corresponding compressive stress at the first and second regions ($CS_1$) and compressive stress at the desired line of separation ($CS_2$)) may be optimized to avoid unstable crack propagation by lowering the $CT_2$ below a certain threshold. $CT_1$ may be controlled to have significantly lower center-tension bands around the desired line of separation to avoid crack-out in any direction other than the desired line of separation. $CT_1$ may be as low as zero in some embodiments when the local temperature reaches approximately the lower of the set points of core and cladding glasses. $CT_2$ may be controlled to be below a certain threshold for defect-free edge quality (e.g., 25 MPa), but sufficient enough for crack self-propagation. In terms of temperature, the lower limit of $T_2$ may be defined by the stress required to maintain propagation of an initial flaw to form a vent; the upper limit may be equal to or less than the lower of the strain points of the core and cladding glasses.

The target offset $R_1$ and center tensions $CT_1$, $CT_2$ may be achieved with optimized heating source parameters. Any device capable of applying the localized heating as described above may be used to cut laminate strengthened glass substrates according to the embodiments described herein. Although heating sources are described in the context of lasers, embodiments are not limited thereto. For example, localized heating may also be provided by thin heating elements that are applied to the surface of the laminate strengthened glass substrate, in some embodiments.

Figure 5:
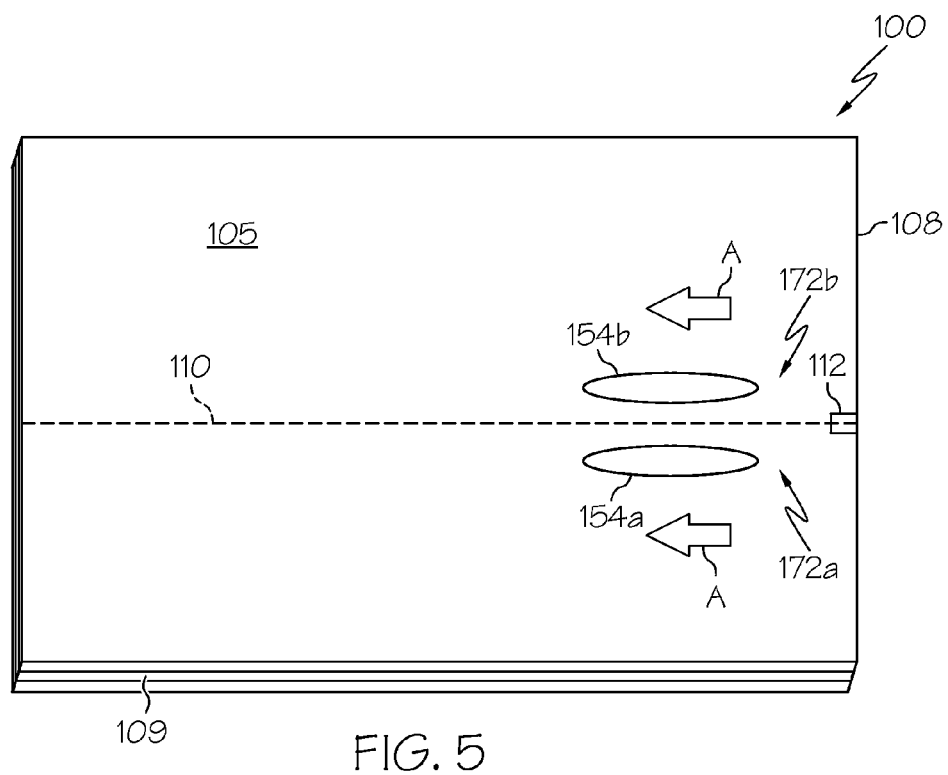
FIG. 5 schematically depicts first and second laser beams on a surface of a laminated strengthened glass substrate according to one or more embodiments shown and described herein.

Referring now to FIG. 5, a surface 105 of a laminate strengthened glass substrate 100 with a first and second laser beam spot 154a, 154b is depicted. As stated above, the surface 105 of the laminate strengthened glass substrate 100 may be heated by heat sources other than laser beam spots 154a, 154b. An edge defect 112 is applied to a first edge 108 of the laminate strengthened glass substrate 100 to provide a starting location for a crack. The edge defect 112 may be formed mechanically, such as with a scoring blade, by laser ablation, or by other methods. The first and second laser beam spots 154a, 154b are used to heat the first and second regions 162a, 162b, respectively, adjacent to a desired line of separation 110.

Figure 6:
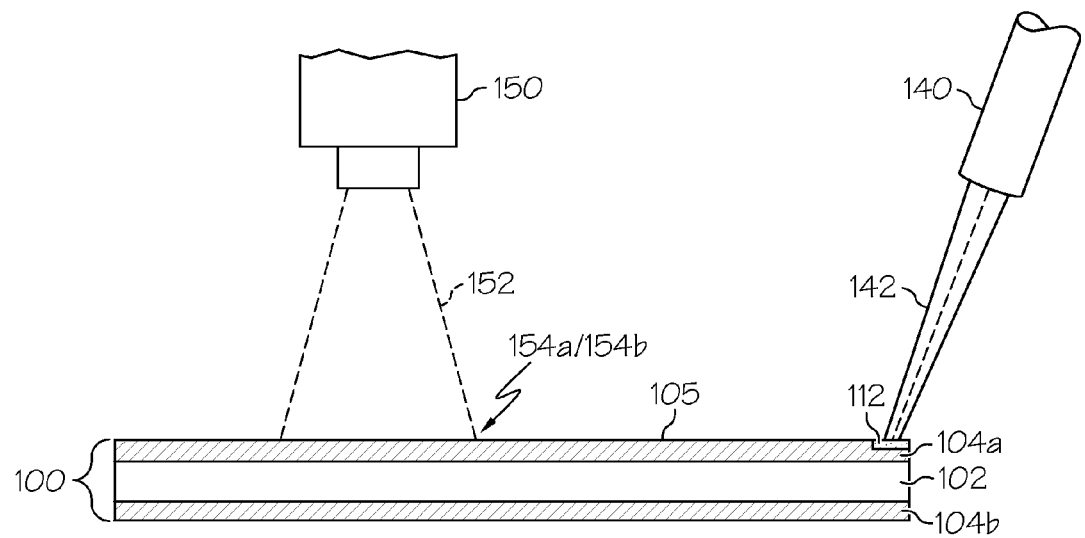
FIG. 6 schematically depicts a system for cutting a laminate strengthened glass substrate according to one or more embodiments shown and described herein.

Referring now to FIG. 6, the first and second laser beam spots 154a, 154b may be formed by one or more laser beams 152 generated by one or more laser sources 150. In some embodiments, the laser source 150 is a $CO_2$ laser source. The laminate strengthened glass substrate 100 and/or the one or more laser sources 150 may be translated such that the first and second laser beam spots 154a, 154b traverse the surface 105 of the laminate strengthened glass substrate 100. In some embodiments, a single laser beam 152 is split using a beam splitter to form the first and second laser beam spots 154a, 154b. In other embodiments, a single laser beam 152 is sequentially scanned on the first region 162a and the second region 162b. The operational parameters of the laser beam 152, including, but not limited to, power level, beam shape, wavelength, pulse frequency, and scan speed. The parameters of the laser beam 152 may be set to achieve the desired temperature profile.

In some embodiments, discrete first and second laser beam spots 154a, 154b are advanced across the surface 105 of the laminate strengthened glass substrate 100. The first and second laser beam spots 154a, 154b may be formed by rapidly scanning the laser beam 152 locally to form elliptical beam spots. In other embodiments, one or more focusing optics (not shown) are used to form the desired shape and size of the first and second laser beam spots 154a, 154b. In other embodiments, as described below and shown in FIG. 8, the first and second laser beam spots 154a', 154b' may be elongated beam spots that traverse the entire surface 105 of the laminate strengthened glass substrate 100.

A cooling jet 142 from a cooling nozzle 140 may be applied to the edge defect 112 in some embodiments to encourage vent formation at the edge defect 112. The cooling jet 142 may be liquid or gas. In one embodiment, the cooling jet 142 is dionized water. The cooling jet 142 may be applied during or just after heating the first and second regions 162a, 162b to form the corresponding first and second reduced central tension zone 172a, 172b. In other embodiments, a cooling jet is not utilized.

Figure 7:
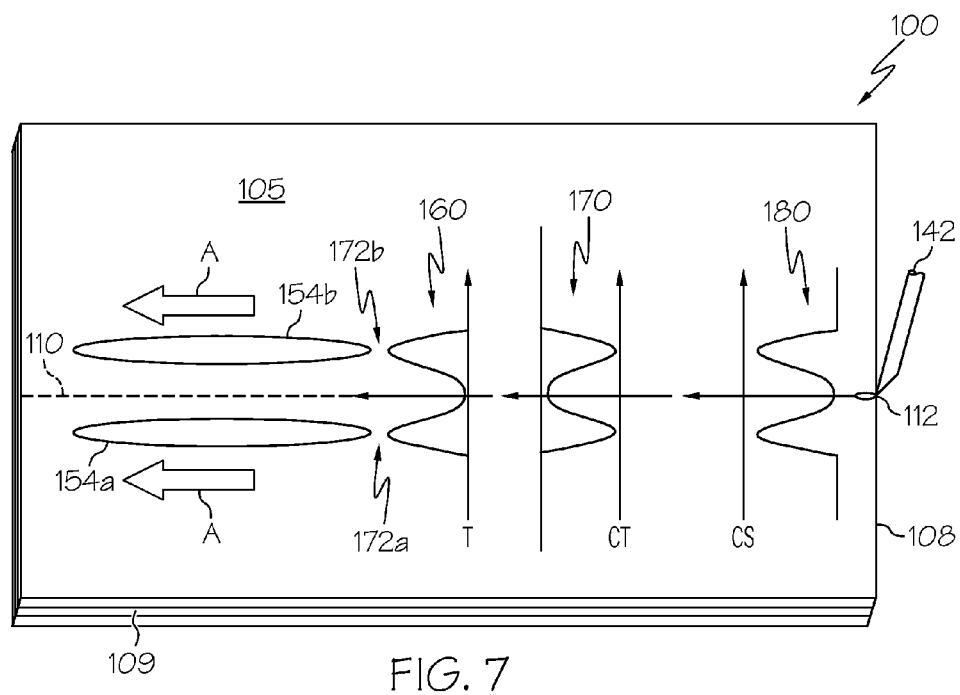
FIG. 7 schematically depicts first and second laser beams on a surface of a laminated strengthened glass substrate along with a temperature profile, a center tension profile, and a compressive stress profile according to one or more embodiments shown and described herein.

Referring now to FIG. 7, a surface 105 of a laminate strengthened glass substrate 100 heated with two laser beam spots 154a, 154b (or other heat source) is illustrated with a corresponding temperature profile 160, a center tension profile 170, and a compressive stress profile 180 superimposed thereon. It is noted that the placement of the temperature profile 160, the center tension profile 170, and the compressive stress profile 180 does not correspond to any particular position on the surface 105, and that they are provided only for illustrative purposes. The temperature profile 160, the center tension profile 170, and the compressive stress profile 180 extend from a first edge 108 to a second edge 109 of the laminate strengthened glass substrate 100.

The dashed line represents the desired line of separation 110. The first and second laser beam spots 154a, 154b are advanced simultaneously or sequentially across the surface 105 as indicated by arrow A to increase the temperature of the laminate strengthened glass substrate 100 near the desired line of separation. The heating is targeted at some small but finite distance from the desired line of separation 110, so that the temperature reaches maximum at some small distance from the desired line of separation 110 symmetrically on two sides. Accordingly, a temperature profile 160 may be obtained. The corresponding CT and CS profiles 170, 180 may also be obtained. The center tension of the laminate strengthened glass substrate 100 has a local maximum at the actual cutting line ($CT_2$), decreases to a local minimum ($CT_1$) where the temperature is maximal, and then increases to the original level before heating ($CT_0$) away from the heated zones.

Figure 8:
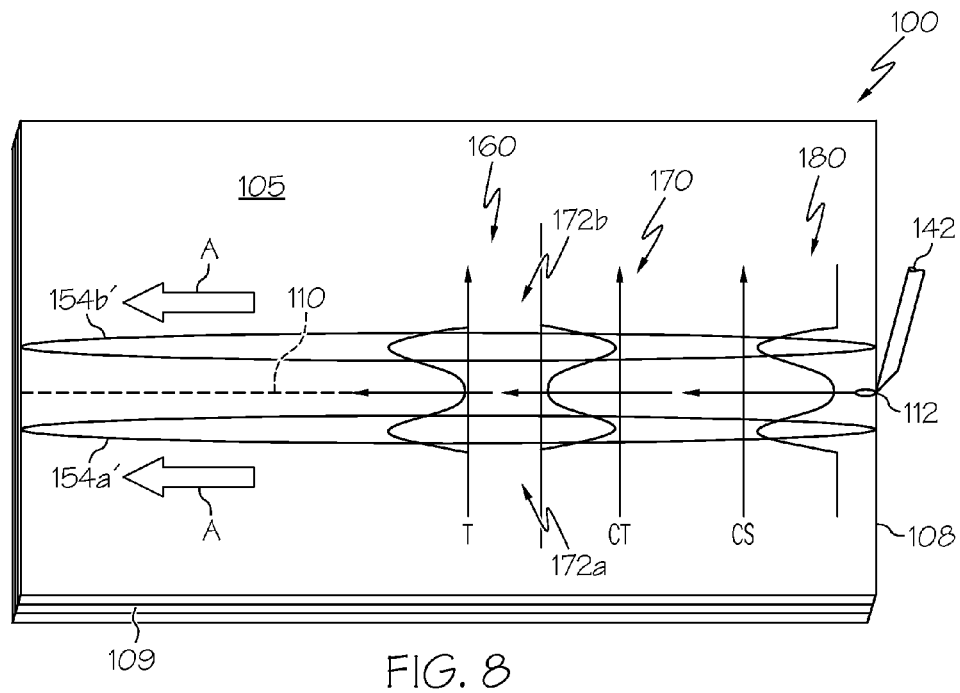
FIG. 8 schematically depicts elongated first and second laser beams on a surface of a laminated strengthened glass substrate along with a temperature profile, a center tension profile, and a compressive stress profile according to one or more embodiments shown and described herein.

As it is proportional to CT, the internal elastic energy and stress intensity factor both have a local maximum at the desired line of separation as well. As described above, the desired line of separation 110 will be the preferred and least-resistance path for crack propagation, as it is bound by the first and second reduced central tension zones 172a, 172b. A through-vent edge defect 112 may be provided to initiate the crack propagation from one edge 108 to another edge 109. In some embodiments, a cooling jet 142 may be applied to the edge defect 112 to further encourage crack propagation. FIG. 8 depicts a first elongated laser beam spot 154a and a second elongated beam spot 154b formed by one or more scanned laser beams. The first elongated laser beam spot 154a and the second elongated beam spot 154b may be formed by a significantly elliptically-shaped laser beam, or one by one or more laser beams having a fast scanning speed, with multiple scanning passes performed in a short time frame, such as seconds. The first and second elongated laser beam spots 154a, 154b may define first and second laser lines on the surface 105 of the laminate strengthened glass substrate 100.

The crack is initiated at the edge defect 112, and then propagates between the first and second reduced central tension zones 172a, 172b. In this manner, the first and second reduced central tension zones 172a, 172b guide the crack as it propagates within the laminate strengthened glass substrate 100.

In some embodiments, a shield component (not shown) may be applied over the desired line of separation 110. The shield component may prevent laser radiation (or other energy, depending on the heating source) from being incident on the surface 105 of the laminate strengthened glass substrate 100 on the desired line of separation 110. The shield component may be configured as a thin piece of material that shields the surface 105 from energy provided by the heating source.

Figure 9A:
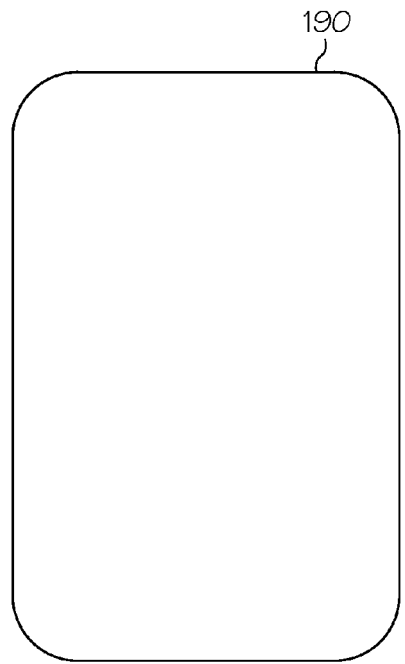
FIGS. 9A and 9B depict two exemplary laminate strengthened glass articles separated from a laminate strengthened glass substrate sheet according to one or more embodiments shown and described herein.
Figure 9B:
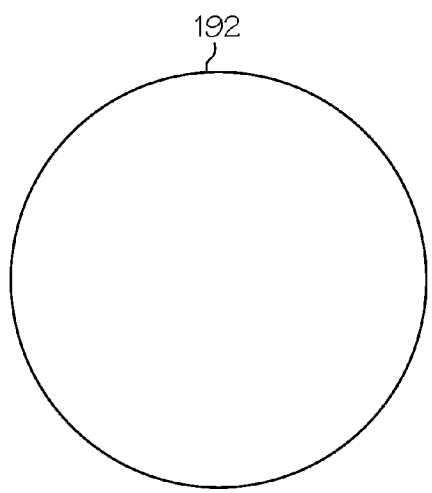

The cutting methods described herein may be utilized to cut laminate strengthened glass substrate sheets into laminate strengthened glass articles, including articles having arbitrary edges, such as curved edges. FIGS. 9A and 9B schematically depict two nonlimiting examples of laminated strengthened glass articles cut from a laminate strengthened glass substrate sheet. The laminate strengthened glass articles may be provided as a cover glass for an electronic device, for example.

Figure 9C:
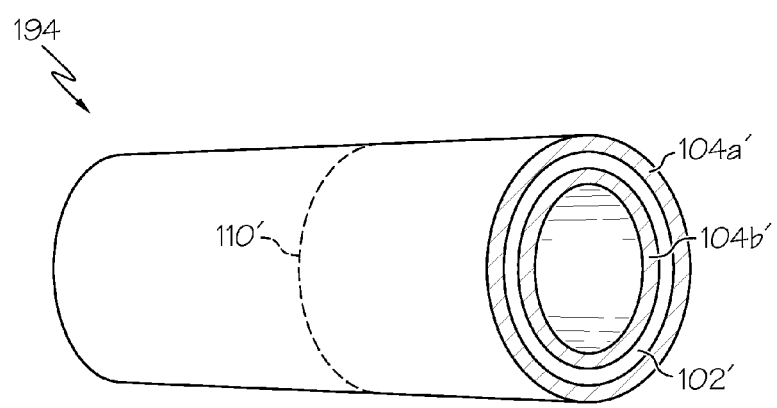
FIG. 9C depicts a laminate glass tube to be cut by application of first and second central tension zones along a desired line of separation.

The methods described herein are not limited to cutting laminate strengthened glass substrate sheets. Referring to FIG. 9C, a laminate strengthened glass substrate configured as a laminate glass tube 194 is depicted. The laminate glass tube 194 comprises an outer glass cladding layer 104a' and an inner glass cladding layer 104b' that surround a glass core layer 102'. The laminate glass tube 100' may be cut along a desired line of separation 110' about a surface of the outer glass cladding layer 104a'. The first and second reduced central tension zones describe above may be applied adjacent to the desired line of separation 110' by an application of thermal energy. In one example, the laminate glass tube 100' is rotated as two laser beams are incident on the outer glass cladding layer 104a' and offset from the desired line of separation 110'. A crack may then propagate along the desire line of separation 110'.

Not only may the cutting methods described herein be used to separate glass articles to size (e.g., the glass articles 190, 192 depicted in FIGS. 9A and 9B), they may also be used in upstream laminate strengthened glass substrate fabrication, such as glass separation at the bottom of draw (BOD), and vertical bead separation (VBS) of the drawn laminate strengthened glass substrate.

Core-Cladding Composition Examples

Below are three core-cladding glass composition pairs that illustrate the impact of localized temperature on CT and CS to achieve a temperature profile (and resulting center tension and compressive stress profiles) as depicted in FIG. 4A.

Core-Cladding Composition Example 1

In a first nonlimiting example, the glass core layer was glass C having an elastic moduli of $10.4 \times 10^6$ psi, a Poisson ratio of 0.22, an average CTE of $98 \times 10^{-7}/°$ C., and T*=581° C. The glass cladding layer was glass D having an elastic moduli of $10.3 \times 10^6$ psi, a Poisson ratio of 0.23, an average CTE of $36.1 \times 10^{-7}/°$ C., and T*=671° C. The thickness of the glass core layer was 0.526 mm and a thickness of the glass cladding layer was 0.0478 mm. Table 1 below illustrates the effect of changing temperature T on CS and CT for this first core-cladding pair:

TABLE 1

Glass C and Glass D Laminate Pair

| T (° C.) | CS (psi) | CT (psi) |
|---|---|---|
| 25 | −42183 | 3833 |
| 300 | −21319 | 1937 |
| 500 | −6145 | 558 |

As shown in Table 1, an increase in temperature T decreases CS and CT in the core-cladding composition pair of Example 1.

Core-Cladding Composition Example 2

In a second nonlimiting example, the glass core layer was glass E having an elastic moduli of $10.4 \times 10^6$ psi, a Poisson ratio of 0.21, an average CTE of $83.6 \times 10^{-7}/°$ C., and T*=564° C. The glass cladding layer was glass F having an elastic moduli of $10.0 \times 10^6$ psi, a Poisson ratio of 0.23, an average CTE of $28.0 \times 10^{-7}/°$ C., and T*=463° C. The thickness of the glass core layer was 0.38 mm and a thickness of the glass cladding layer was 0.076 mm. Table 2 below illustrates the effect of changing temperature T on CS and CT for this second core-cladding pair example:

TABLE 2

Glass E and Glass F Laminate Pair

| T (° C.) | CS (psi) | CT (psi) |
|---|---|---|
| 25 | −26415 | 5283 |
| 300 | −15861 | 3172 |
| 500 | −3799 | 760 |

As shown in Table 2, an increase in temperature T decreases CS and CT in the core-cladding composition pair of Example 2.

Core-Cladding Composition Example 3

In a third nonlimiting example, the glass core layer was glass G having an elastic moduli of $10.4 \times 10^6$ psi, a Poisson ratio of 0.21, an average CTE of $81.4 \times 10^{-7}/°$ C., and T*=604° C. The glass cladding layer was glass H having an elastic moduli of $10.9 \times 10^6$ psi, a Poisson ratio of 0.23, an average CTE of $43.5 \times 10^{-7}/°$ C., and T*=635° C. The thickness of the glass core layer was 0.38 mm and a thickness of the glass cladding layer was 0.076 mm. Table 3 below illustrates the effect of changing temperature T on CS and CT for this third core-cladding pair example:

TABLE 3

Glass G and Glass H Laminate Pair

| T (° C.) | CS (psi) | CT (psi) |
|---|---|---|
| 25 | −25566 | 5113 |
| 300 | −13423 | 2685 |
| 500 | −4592 | 918 |

As shown in Table 3, an increase in temperature T decreases CS and CT in the core-cladding composition pair of Example 3.

Laminate Strengthened Glass Substrates Cutting Examples

Provided below are two nonlimiting examples of cutting laminate strengthened glass substrates according to the embodiments described herein.

Cutting Example 1

In a first nonlimiting cutting example, the laminate strengthened glass substrate sheet had a glass core layer of glass A and two glass cladding layers of glass E formed by a redraw process. The glass A had an elastic moduli of $10.6 \times 10^6$ psi, a Poisson ratio of 0.21, an average CTE of $91.1 \times 10^{-7}/°$ C., and T*=556° C. The glass E had an elastic moduli of $10.4 \times 10^6$ psi, a Poisson ratio of 0.206, an average CTE of $80.9 \times 10^{-7}/°$ C., and T*=565° C. The thickness of the glass core layer was 0.38 mm and a thickness of the glass cladding layer was 0.076 mm. Table 4 below illustrates the effect of changing temperature T on CS and CT for this example:

TABLE 4

Glass A and Glass E Laminate Pair

| T (° C.) | CS (psi) | CT (psi) |
|---|---|---|
| 25 | −5935.63 | 1187.1 |
| 300 | −2861.62 | 572.3 |
| 500 | −625.98 | 125.2 |

A $CO_2$ laser beam was focused to a diameter of approximately 1.5 mm. The laser beam was sequentially scanned over two parallel lines forming first and second laser beam spots. The two laser beam spots were separated by an offset $R_1$ of approximately 1.5 mm, with a length of approximately 230 mm. The $CO_2$ laser was operated at a frequency of 40 kHz and a power of 230 W. The laser beam was scanned on the surface of the laminate strengthened glass substrate at a speed of 30 m/s with a galvo scanner.

An edge defect was created on an edge of the laminate strengthened glass substrate sheet with a diamond scribe, along the cutting path. The laminate strengthened glass substrate sheet was placed on a cutting table, with the edge defect located in between the two parallel laser beam spots formed by the rapidly scanning laser beam. The laser was incident on the surface for about one second before it was turned off. A cooling jet of water was switched on at the edge defect immediately after turning the laser off for a time of less than about 0.5 seconds. A full-body crack was generated at the site of edge defect and controllably propagated along the desired line of separation.

Cutting Example 2

In a second nonlimiting cutting example, the laminate strengthened glass substrate sheet had a glass core layer of glass I and two glass cladding layers of glass J. The glass I had an elastic moduli of $10.9 \times 10^6$ psi, a Poisson ratio of 0.24, an average CTE of $42.0 \times 10^{-7}/°$ C., and T*=632° C. The glass J had an elastic moduli of $10.0 \times 10^6$ psi, a Poisson ratio of 0.206, an average CTE of $35.0 \times 10^{-7}/°$ C., and T*=629° C. The thickness of the glass core layer was 0.375 mm and a thickness of the glass cladding layer was 0.275 mm. Table 5 below illustrates the effect of changing temperature T on CS and CT for this example:

TABLE 5

Glass I and Glass J Laminate Pair

| T (° C.) | CS (psi) | CT (psi) |
|---|---|---|
| 25 | −53326 | 2439 |
| 300 | −1812 | 1328 |
| 500 | −710 | 521 |

A $CO_2$ laser beam was focused to a diameter of approximately 1.5 mm. The laser beam was sequentially scanned over two parallel lines forming first and second laser beam spots. The two laser beam spots were separated by an offset $R_1$ of approximately 1.0 mm, with a length of approximately 230 mm. The $CO_2$ laser was operated at a frequency of 40 kHz and a power about 230 W and about 260 W. The laser beam was scanned on the surface of the laminate strengthened glass substrate at a speed of 30 m/s with a galvo scanner.

An edge defect was created on an edge of the laminate strengthened glass substrate sheet with a diamond scribe, along the cutting path. The laminate strengthened glass substrate sheet was placed on a cutting table, with the edge defect located in between the two parallel laser beam spots formed by the rapidly scanning laser beam. The laser was incident on the surface for about 1.5 seconds before it was turned off. A cooling jet of water was switched on at the edge defect immediately after turning the laser off for a time of less than about 0.2 seconds. A full-body crack was generated at the site of edge defect and controllably propagated along the desired line of separation.

It should now be understood that the methods described herein may be used to cut laminated strengthened glass substrates by applying a temperature profile to a surface of a glass cladding layer to produce first and second reduced center tension zones adjacent to a desired line of separation. The first and second reduced center tension zones guide a propagating crack that is initiated at an edge of the laminated strengthened glass substrate by providing a path of least resistance. The cutting methods described herein may be utilized to controllably cut shaped glass articles from laminated strengthened glass substrate sheets, as well as to cut laminated strengthened glass substrates during fabrication, such as bottom of draw separation and vertical bead separation. Thus, methods and apparatus disclosed herein for cutting laminate strengthened glass substrates can be used as alternatives to known methods and apparatus.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of cutting a laminate strengthened glass substrate, the method comprising:
    providing a laminate strengthened glass substrate comprising:
        a glass core layer having a first surface portion and a second surface portion opposite the first surface portion;
        at least one glass cladding layer fused to the first surface portion or the second surface portion of the glass core layer, wherein the glass core layer has an average core coefficient of thermal expansion $CTE_{core}$, and the at least one glass cladding layer has an average cladding coefficient of thermal expansion $CTE_{cladding}$ which is less than the average core coefficient of thermal expansion $CTE_{core}$;
    forming an edge defect at an edge of the laminate strengthened glass substrate;
    heating a first region of the laminate strengthened glass substrate on the at least one glass cladding layer, wherein the first region is offset from a first side of a desired line of separation;
    heating a second region of the laminate strengthened glass substrate on the at least one glass cladding layer, wherein the second region is offset from a second side of the desired line of separation, and the second region is simultaneously heated with the first region; and
    propagating a crack along the desired line of separation between the first and second regions of the laminate strengthened glass substrate, wherein the crack is initiated at the edge defect.

2. The method of claim 1, further comprising applying a cooling jet at the edge defect.

3. The method of claim 1, further comprising shielding the desired line of separation during the heating the first and second regions of the laminate strengthened glass substrate to prevent thermal energy from being applied to a surface of the laminate strengthened glass substrate along the desired line of separation.

4. The method of claim 1, wherein a temperature of the laminate strengthened glass substrate in the first and second regions is greater than a temperature of the laminate strengthened glass substrate along the desired line of separation.

5. The method of claim 1, wherein a temperature of the laminate strengthened glass substrate in the first and second regions is less than a strain point of the glass core layer and is less than a strain point of the at least one glass cladding layer.

6. The method of claim 1, wherein:
    the first region is heated by scanning one or more laser beams back and forth along a first laser scan line on a surface of the at least one glass cladding layer; and
    the second region is heated by scanning the one or more laser beams back and forth along a second laser scan line on the surface of the at least one glass cladding layer.

7. The method of claim 1, wherein:
the first region is heated by advancing a first laser beam spot on a surface of the at least one glass cladding layer; and
the second region is heated by advancing a second laser beam spot on the surface of the at least one glass cladding layer.

8. The method of claim 1, wherein:
the first region is heated by applying a first elongated laser beam spot on a surface of the at least one glass cladding layer along an entire length of the laminate strengthened glass substrate; and
the second region is heated by a second elongated laser beam spot on the surface of the at least one glass cladding layer along the entire length of the laminate strengthened glass substrate.

9. The method of claim 1, wherein the laminate strengthened glass substrate is configured as a laminate glass tube.

10. A method of cutting a laminate strengthened glass substrate, the method comprising:
providing a laminate strengthened glass substrate comprising:
a glass core layer having a first surface portion and a second surface portion opposite the first surface portion;
at least one glass cladding layer fused to the first surface portion or the second surface portion of the glass core layer, wherein the glass core layer has an average core coefficient of thermal expansion $CTE_{core}$, and the at least one glass cladding layer has an average cladding coefficient of thermal expansion $CTE_{cladding}$ which is less than the average core coefficient of thermal expansion $CTE_{core}$;
forming a first reduced central tension zone extending along a desired line of separation, wherein the first reduced central tension zone is offset from a first side of the desired line of separation, and the first reduced central tension zone has a reduced tension $CT_1$ that is less than a center tension $CT_2$ along the desired line of separation;
forming a second reduced central tension zone extending along the desired line of separation, the second reduced central tension zone is offset from a second side of the desired line of separation, and the second reduced central tension zone has the reduced center tension $CT_1$ that is less than the center tension $CT_2$ along the desired line of separation; and
propagating a crack along the desired line of separation between the first reduced central tension zone and the second reduced central tension zone.

11. The method of claim 10, further comprising forming an edge defect at an edge of the laminate strengthened glass substrate prior to forming the first reduced central tension zone and the second reduced central tension zone.

12. The method of claim 11, further comprising applying a cooling jet at the edge defect following forming the first reduced central tension zone and the second reduced central tension zone.

13. The method of claim 10, further comprising shielding the desired line of separation prior to forming the first reduced central tension zone and the second reduced central tension zone.

14. The method of claim 13, wherein:
the first reduced central tension zone and the second reduced central tension zone are formed by scanning one or more laser beams back and forth along a surface of the at least one glass cladding layer; and
the shielding the desired line of separation comprises preventing the one or more laser beams from being incident on the surface of the at least one glass cladding layer along the desired line of separation.

15. The method of claim 10, wherein the second reduced central tension zone is formed simultaneously with the first reduced central tension zone.

16. The method of claim 10, wherein the first reduced central tension zone and the second reduced central tension zone are formed by heating a surface of the at least one glass cladding layer.

17. The method of claim 10, wherein:
the first reduced central tension zone is formed by a first laser scan line on a surface of the at least one glass cladding layer;
the second reduced central tension zone is formed by a second laser scan laser line on the surface of the at least one glass cladding layer; and
the first laser scan line and the second laser scan laser line are formed by scanning one or more laser beams back and forth along an entire length of the laminate strengthened glass substrate.

18. The method of claim 10, wherein:
the first reduced central tension zone is formed by advancing a first laser beam spot on a surface of the at least one glass cladding layer; and
the second reduced central tension zone is formed by advancing a second laser beam spot on the surface of the at least one glass cladding layer.

19. The method of claim 10, wherein:
the first reduced central tension zone is formed by applying a first elongated laser beam spot along an entire length of the first reduced central tension zone on a surface of the at least one glass cladding layer; and
the second reduced central tension zone is formed by applying a second elongated laser beam spot along the entire length of the second reduced central tension zone on the surface of the at least one glass cladding layer.

20. The method of claim 10, wherein the center tension $CT_2$ along the desired line of separation is less than a native center tension $CT_0$ present within the laminate strengthened glass substrate outside of the first reduced central tension zone, the second reduced central tension zone, and the desired line of separation.

* * * * *